United States Patent Office 3,036,917
Patented May 29, 1962

3,036,917
FEEDING RUMINANTS 9α-FLUORO-16α-METHYLPREDNISOLONE
Leslie D. Harrop, Wakeshma Township, Kalamazoo County, Mich., assignor to The Upjohn Company, Kalamazoo, Mich., a corporation of Delaware
No Drawing. Filed Nov. 10, 1959, Ser. No. 851,975
1 Claim. (Cl. 99—2)

This invention relates to compositions and methods for animal husbandry and more particularly to animal feed compositions comprising 9α-fluoro-16α-methylprednisolone and a method for obtaining increased productivity in meat-producing animals.

It has been found in recent years that meat-producing animals will gain more weight when various classes of compounds such as vitamins, minerals, estrogens, antibiotics and tranquilizers, are added to the diet. Although the use of these compounds, singly and in combination is effective to increase animal weights, it is advantageous to obtain still further weight increases or increased utilization of feedstuffs.

It has now been discovered that in meat-source animals such as ruminants, swine, poultry and the like, an increased rate of growth and/or an enhanced utilization of feedstuff can be produced according to the process of the present invention which comprises administering 9α-fluoro-16α-methylprednisolone to healthy animals.

As used in the specification and claims the term 9α-fluoro-16α-methylprednisolone shall be taken to mean the free alcohol as well as the pharmacologically acceptable 21-esters thereof. Suitable esterifying acids include hydrocarbon carboxylic acids containing from 1 to 12 carbon atoms. Illustrative 21-esters include the acetate, the propionate, the cyclopentylpropionate, the phenylpropionate and the like.

Unless otherwise specified, all percentages and other ratios are given on a weight-to-weight basis. The pound (lb.) weights given are avoirdupois units.

The steroid can be administered parenterally by injection or pellet implantation and orally in the form of a drench or bolus; however, the administration of these forms requires the periodic segregation and handling of each individual animal. The preferred method for administration is in association with the feed. By this method, except for the initial mixing, no extra labor or skill is required of the husbandman.

Advantageously the steroid is supplied in the form of a liquid or solid premix wherein the steroid concentration is 100 or 200 times greater than the desired steroid concentration in the feed. For example, the steroid can be dissolved in a volatile organic solvent (which is later removed by drying), such as chloroform, or in an edible oil, such as corn oil, to prepare a fluid premix. Alternatively, a solid premix can be prepared by mixing the steroid with an edible diluent such as sugar, talc, starch, and the like.

The concentration of steroid in the feed composition is determined with regard to the weight of the animal and the average amount of feed consumed daily. The concentration is then that amount which will provide up to 1 mg. of 9-fluoro-16α-methylprednisolone per 100 lb. of body weight per day. The daily consumption of from 0.001 to 1 mg. of steroid per 100 lb. of body weight is preferred.

A group of fifty weaned Chester-White pigs, approximately ten weeks of age, were weighed individually and then randomly allotted among five groups on the basis of weight and sex. Each group of ten pigs was placed in a separate concrete floored pen, provided with an automatic waterer and self fed a diet as shown in Table I. Group 1 received Swine Growing Diet with a steroid additive and served as a control group. Groups 2 and 3 received Swine Growing Diet with 9α-fluoroprednisolone added at two concentration levels and served as control groups for comparing the effect of feeding a related steroid.

TABLE I

| Group | Diet |
|---|---|
| 1 | Swine Growing Diet.[1] |
| 2 | Swine Growing Diet with 9α-fluoroprednisolone acetate, 0.5725 mg./lb. feed. |
| 3 | Swine Growing Diet with 9α-fluoroprednisolone acetate, 1.715 mg./lb. feed. |
| 4 | Swine Growing Diet with 9α-fluoro-16α-methylprednisolone, 0.1725 mg./lb. feed. |
| 5 | Swine Growing Diet with 9α-fluoro-16α-methylprednisolone 0.3430 mg./lb. feed. |

[1] Swine Growing Diet is the feed disclosed in the first paragraph of Example 1.

The pigs were weighed individually at periodic intervals and a record of feed consumption was maintained for each group. The results of thirteen days feeding is shown in Table II.

TABLE II [1]

| Group (10 pigs/group) | 1 | 2 | 3 | 4 | 5 |
|---|---|---|---|---|---|
| Starting Wt., lb | 61.2 | 61.9 | 61.4 | 61.9 | 61.5 |
| Final Wt., lb | 75.8 | 77.1 | 74.1 | 79.2 | 77.2 |
| Daily Gain/pig | 1.12 | 1.17 | 0.98 | 1.33 | 1.21 |
| Daily Feed Intake/lb.[2] | 3.4 | 3.8 | 3.6 | 3.1 | 3.4 |
| Lb. Feed Consumed/100 lb. gain [2] | 301.4 | 323.7 | 364.6 | 235.8 | 278.3 |

[1] Figures represent averages for each group.
[2] Feed wastage occurred in all groups and observations indicated that the degree of feed wastage was similar for each of the groups. Therefore, while the figures pertaining to feed consumption and feed utilization are a little high, the relative values are correct.

The results of thirteen days' feeding shown on Table II indicate the advantages obtained from the present invention, i.e., an increased rate of weight gain and a more efficient utilization of feed. Group 4 had an increase of 18.9% over the control. Group 5 had an increase of 8% over the control. Although the figures representing feed utilization are not accurate per se for reason of the feed wastage, the relative values indicate that for a similar weight increase the control required 6 parts of feed to 5 parts for groups 4 and 5.

The following examples, setting forth the best mode contemplated by applicant, are illustrative of the compositions and processes of the present invention but are not to be construed as limiting.

*Example 1*

A swine growing diet for hogs of 40 to 100 pounds body weight is prepared from the following types and amounts of ingredients:

| | Percent |
|---|---|
| Corn, ground | 78.15 |
| Soybean oil meal, 44% | 17.0 |
| Meat and bone scraps, 50% | 3.0 |
| Oyster shell flour | 0.4 |
| Bonemeal | 0.5 |
| Salt | 0.5 |
| Trace mineral mixture [1] | 0.05 |
| Zinc oxide | 0.01 |
| Vitamin A and D supplement [2] | 0.22 |
| B Vitamin supplement [3] | 0.04 |
| Vitamin $B_{12}$ supplement [4] | 0.08 |
| Chlortetracycline supplement [5] | 0.05 |

[1] Contains the following percent of minerals: Mn, 12; Co, 0.08; Fe, 5.0; Cu, 0.4; I, 0.24; Zn, 0.7.
[2] Contains 300 U.S.P. units $D_3$/gm. and 1500 I.U.A./gm.
[3] Contains per lb.: riboflavin, 2000 mg.; calcium pantothenate, 4000 mg.; niacin, 9000 mg.; and choline chloride, 10,000 mg.
[4] Contains 6 mg. vitamin $B_{12}$ per lb.
[5] Contains 10 gm. chlortetracycline per lb.

To 99 parts of the preceding feed is added 1 part of a premix composition prepared by mixing 17.25 mg. of 9α-fluoro-16α-methylprednisolone with sufficient powdered sugar to make one pound.

The feeding composition so prepared supplies 0.1725 mg. of steroid per pound, or about 1 part in 3 million.

The foregoing composition is usefully fed to hogs for increased rate of weight gain and improved utilization of feed.

*Example 2*

A fattening feed for 800 pound yearling cattle is prepared from the following types and amounts of ingredients:

| | Percent |
|---|---|
| Ground ear corn | 89.75 |
| Soybean oil meal, 44% | 9.0 |
| Ground limestone | 0.7 |
| Salt | 0.5 |
| Trace mineral mixture [1] | 0.05 |

[1] Contains the following percent of minerals: Mn, 12; Co, 0.08; Fe, 5.0; Cu, 0.4; I, 0.24; Zn, 0.7.

To 99 parts of the preceding feed is added 1 part of a premix composition prepared by mixing 12.9 mg. of 9α-fluoro-16α-methylprednisolone with sufficient wheat flour to make 1 pound.

The feeding composition so prepared supplies 0.129 mg. of steroid per pound, or about 1 part in 4 million.

Cattle are to receive the foregoing feed ad libitum together with 5 lb. of hay per head per day and when so fed have an increased rate of weight gain and improved utilization of feed.

*Example 3*

A chicken feed for broilers is prepared from the following types and amounts of ingredients:

| | Percent |
|---|---|
| Yellow corn meal | 67.35 |
| Soybean oil meal | 24.00 |
| Menhaden fish meal | 6.00 |
| Steamed bone meal | 1.00 |
| Ground limestone | 1.00 |
| Iodized salt | .34 |
| 25% choline chloride | .13 |
| Vitamin B$_{12}$ supplement (6 mg./lb.) | .10 |
| Manganese sulfate | .02 |
| Supplemental vitamin mix [1] | .06 |

[1] Consisting of 16.0 gm. vitamin A supplement (10 units/mg.); 3.6 gm. vitamin D$_3$ supplement (15,000 units/gm.); 7.1 gm. riboflavin supplement (1 gm. riboflavin per ounce); 500 mg. niacin.

To 99 parts of the preceding feed is added 1 part of a premix composition prepared by mixing 50 mg. of 9α-fluoro-16α-methylprednisolone with sufficient talc to make 1 pound.

The feeding composition so prepared supplies 0.5 mg. of steroid per pound, or about 1 part in 1 million.

The foregoing composition is usefully fed to chickens for increased rate of weight gain and improved utilization of feed.

What is claimed is:

A process for obtaining increased weight gain in healthy meat-producing ruminant animals comprising the feeding to ruminant animals of 9α-fluoro-16α-methylprednisolone in combination with an animal feed wherein the feeding to ruminant animals is in an amount sufficient to provide up to 1 mg. of 9α-fluoro-16α-methylprednisolone per 100 pounds of body weight per day.

References Cited in the file of this patent

UNITED STATES PATENTS

| | | |
|---|---|---|
| 2,824,546 | Klette | Feb. 25, 1958 |
| 2,880,135 | Eppstein | Mar. 31, 1959 |
| 2,951,759 | De Zeeuw | Sept. 6, 1960 |

FOREIGN PATENTS

| | | |
|---|---|---|
| 506,216 | Belgium | Oct. 31, 1951 |

OTHER REFERENCES

Oliveto: Am. Chem. Soc. Jr. 80, August 1958, p. 4431.